United States Patent
Chatani et al.

(10) Patent No.: US 8,173,329 B2
(45) Date of Patent: May 8, 2012

(54) MOLDED PRODUCT AND METHOD FOR MANUFACTURING SAME

(75) Inventors: Shunsuke Chatani, Otake (JP); Toshiaki Hattori, Yokohama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 397 days.

(21) Appl. No.: 12/435,014

(22) Filed: May 4, 2009

(65) Prior Publication Data

US 2009/0268294 A1 Oct. 29, 2009

Related U.S. Application Data

(63) Continuation-in-part of application No. 12/444,960, filed as application No. PCT/JP2007/071234 on Oct. 31, 2007.

(30) Foreign Application Priority Data

Oct. 31, 2006 (JP) .................. 2006-296685

(51) Int. Cl.
  *G03F 7/00* (2006.01)
  *B29D 11/00* (2006.01)
  *G02B 1/12* (2006.01)
(52) U.S. Cl. .......................................... 430/2; 264/1.38
(58) Field of Classification Search .................. 359/566; 430/1, 2; 264/1.38
  See application file for complete search history.

(56) References Cited

U.S. PATENT DOCUMENTS 5,763,064 A * 6/1998 Suzuki et al. ................. 428/216
2006/0263583 A1* 11/2006 Hattori et al. ................ 428/221

FOREIGN PATENT DOCUMENTS

| EP | 1 710 273 A1 | 10/2006 |
| JP | 03-284702 A | 12/1991 |
| JP | 11-287906 A | 10/1999 |
| JP | 2005-242340 A | 9/2005 |
| TW | 200532250 | 10/2005 |
| TW | I262327 | 9/2006 |

OTHER PUBLICATIONS

Computer Translation of JP 11-287906 published 1999.*
T. Hattori et al., "Control of Microstructure in Photo-polymerizatio Induced phase-separatio Film and its Application", Oyo Butsurigaku Kankei rengo Koenkai Koen Yokoshu, vol. 54th, No. 3 Mar. 27, 2007, p. 1294.
S. Chatani et al., "Control of photopolymerization-Induced Phase Separated Structure by tiling", 15th Plymer Material Forum Koen yokoshu, Nov. 1, 2006, vol. 15th, p. 214.

* cited by examiner

*Primary Examiner* — Alessandro Amari
(74) *Attorney, Agent, or Firm* — Morgan, Lewis & Bockius LLP

(57) ABSTRACT

A molded product having a phase separation structure formed by photopolymerization of a photopolymerizable composition and imparting a sharp diffraction spot at a high diffraction efficiency, and a method for manufacturing same are provided. The molded product (1) comprises a matrix (2) and a multiple columnar structures (3) disposed within the matrix (2) and having an index of refraction different from the matrix (2), wherein the half width of a diffraction spot is 0.6° or less and diffraction efficiency is 10% or greater in an angular spectrum obtained by irradiation with a laser beam having an intensity distribution of standard normal distribution and a half width of the intensity distribution of 0.5°. The multiple columnar structures (3) are oriented in approximately the same direction, and are aligned in a regular lattice on a plane perpendicular to said orientation direction.

2 Claims, 7 Drawing Sheets

MOLDED PRODUCT AND METHOD FOR MANUFACTURING SAME

CROSS REFERENCE TO RELATED APPLICATIONS

This is continuation-in-part of U.S. application Ser. No. 12/444,960, filed Apr. 9, 2009, which is a national stage of PCT International Application No. PCT/JP2007/071234, filed Oct. 31, 2007, which claims the benefit of Japanese Patent Application No. 2006-2966865, filed Oct. 31, 2006, all of which are hereby incorporated by reference in their entireties.

TECHNICAL FIELD

The present invention relates to a molded product such as an film used as an optical part, with optical properties such as diffraction, polarization, or diffusion.

BACKGROUND ART

Due to their rich selection of materials and wide variety of functions, attempts to apply polymer materials for optical purposes have been growing in recent years. For example, polymer molded products in which fine scale one or two-dimensional structures are formed can be used as light control elements or light diffraction elements.

A known molded product of this type is a polymer film having a phase structure whereby in a polymer matrix, multiple structures having an index of refraction different from that of the matrix are oriented in the same direction (see Documents 1 and 2). Polymer films having this type of phase structure impart a diffraction spot when incident light is parallel to the axial direction of the structure, due to the above-described layout of the structure. Therefore polymer films of this type can be used as light diffraction elements for diffracting incident light at a specific position and a specified intensity.

A film having such a structure and a method of fabricating same is set forth in Document 1. In Document 1, the film is produced by photopolymerizing at a fixed film thickness by irradiating with light from a linear light source directed from a specified angle. Film fabricated in this way selectively diffracts light incident at a specific incidence angle.

Document 2 sets forth a film with a sea-island phase structure; this film is formed such that a columnar island structure extends in the film thickness direction within a sea structure.

In this method, the photo polymerizable composition is first coated onto a substrate at a uniform thickness, then that surface is covered with a mask. A large number of holes are randomly patterned into this mask. Next, ultraviolet light is shone on the surface of the photo polymerizable composition through this mask, thus forming columnar bodies which serve as the island structures. After the columnar bodies are formed, the mask is removed and further ultraviolet radiation is shone on the film, thereby polymerizing the sea structure portions.

Document 1: JP-A-03-284702
Document 2: JP-A-11-287906

DISCLOSURE OF THE INVENTION

Problems the Invention is to Solve

However, while it did function as a light control element for changing light transmissivity depending on incidence angle, the internal phase structure of parallel strips in the film set forth in Document 1 meant that it had only low one dimensional regularity as a light diffraction element, and did not diffract incident light at a high efficiency or impart a diffraction spot exhibiting a steep angular spectrum.

The film set forth in Document 2 did not have regularity in its arrangement of island structures, and scattered incident light, therefore it did not impart a sharp diffraction spot.

Light passing through an opening is known to spread due to diffraction. For a plane wave of wavelength $\lambda$ incident on a circular aperture with a radius a, the intensity I on the image plane after diffraction is given by the following formula for a distance L of the image plane from the aperture, and a distance r from the center of the image plane:

$$I = (\pi a^2)^2 [2J_1(R)/R]^2$$

$$(R = 2\pi ar/\lambda L) \qquad (1)$$

The distance $r_{min}$ at which the diffraction intensity in the image plane first displays a minimum value is obtained as the first zero point of $J_1(R)$, i.e. R=3.83. It is known that of the entire light quantity, approximately 84% of the energy is concentrated in the circle having radius $r_{min}$, and $r_{min}$ is a rough indication of the spreading of diffracted light from a circular aperture.

For example, if light with a wavelength of 365 nm passes through a circular aperture of a=1 μm, then r=5 μm at L=45 μm. In other words, this indicates that light passing through a circular aperture with a radius of 1 μm blurs to a circle of 5 μm radius when it advances by 45 μm. It is difficult, that is, to form a 1 μm radius columnar structure with a high aspect ratio by irradiation through a photomask only. An example of forming island structures using a photomask is given in Document 2, but no consideration is given to light diffraction, and it would consider that high aspect ratio columnar structures cannot be thus formed. That is, a film for diffracting light at a high diffraction efficiency onto a specified pattern can not be fabricated by the method of Document 2.

As described above, it was not possible in the past to use photopolymerization to fabricate a polymer film for imparting a sharp diffraction spot at a high diffraction efficiency. Therefore the above-described polymer films could not be used for optical low-pass filters and the like which required a light diffraction plate for diffracting light in a specified pattern at a high diffraction efficiency.

The present invention was undertaken to solve this type of problem, and is a molded product having a phase structure formed by photopolymerization of a photopolymerizable composition, with the object of providing a molded product for imparting a sharp diffraction spot at a high diffraction efficiency, and a method for manufacturing same. It has the further object of providing optical low pass filters and the like using the above-described molded product.

Means for Solving the Problems

The present invention is a molded product having a phase structure comprising a matrix and multiple columnar structures disposed within said matrix and having an index of refraction different from said matrix, wherein the half width of a diffraction spot is 0.6° or less, and diffraction efficiency is 10% or greater in an angular spectrum obtained by irradiation with a laser beam having an intensity distribution of standard normal distribution and a half width of the intensity distribution of 0.5°.

In a preferred embodiment of the present invention, the multiple columnar structures are oriented in approximately the same direction, and are disposed in a regular lattice on a plane perpendicular to said orientation direction.

Also, in a preferred embodiment of the present invention, the multiple columnar structures have approximately the same cross sectional shape in the direction perpendicular to the orientation direction.

Also, in a preferred embodiment of the present invention, the columnar structures have an aspect ratio of 10 or greater.

In addition, in a preferred embodiment of the present invention, the matrix and columnar structures comprise a polymerized object of an acrylic photopolymerizable composition.

The optical laminate of the present invention comprises the molded product above, and an optically transparent film laminated thereto.

Also, the optical laminate of the present invention comprises the above-described molded product and a glass substrate formed as one piece with this molded product so as to support the molded product.

Furthermore, the optical low-pass filter of the present invention uses the above-described optical laminate.

Furthermore, the imaging optical system of the present invention comprises a fixed image sensor, and the above-described low-pass filter disposed on the photo-detection surface of the fixed image sensor via a gap layer.

The present invention is a method for manufacturing a molded product having a phase structure, comprising a matrix formed of a photo polymerizable composition and multiple columnar structures disposed within said matrix, having an index of refraction different from that of said matrix, said method comprising a step for injecting a photopolymerizable composition containing a photopolymerizing monomer or oligomer and a photoinitiator into a mold; a step for disposing a photomask having optically transmissive regions and an optically non-transmissive region between the mold and a light source; a first light irradiation step for directing parallel light from the light source with a wavelength half width of 100 nm or less and an approximately uniform light intensity distribution toward the photopolymerizable composition within the mold via a photomask and irradiating same, and for polymerizing sites irradiated with parallel light within the photopolymerizable composition into an incompletely polymerized state; and a second light irradiation step in which the photomask is removed and parallel light with a wavelength half width of 100 nm or less and an approximately uniform light intensity distribution is further directed at and used to irradiate the photopolymerizablephotopolymerizable composition, thereby completing the polymerization of the photopolymerizablephotopolymerizable composition.

The present invention thus has a first irradiation step in which parallel light is irradiated via a photomask onto a photopolymerizable composition filled into a mold, and a second irradiation step in which the photomask is removed and parallel light continues to be irradiated.

In the first irradiation step, the photopolymerizable composition irradiated by parallel light is not completely polymerized by photopolymerization, and is preferably polymerized to a polymerization degree of 10%-80%, which only determines the formation positions of the columnar structures.

This is because in the first irradiation step, due to the spreading of light by diffraction of the parallel light passing through the optically transmissive regions of the photomask, light reaches a portion of the matrix where there is not actually any need for irradiation, such that when parallel light is irradiated to the entire surface in the second irradiation step which follows, there ceases to be a significant difference in index of refraction between the matrix and the columnar structures.

Therefore in the present invention, polymerization of the whole is completed in the second irradiation step by irradiating the entirety with parallel light, starting from an incompletely polymerized state in which there is some degree of difference in the polymerization degree between the matrix and the columnar structures within the photopolymerizable composition.

By thus irradiating the photopolymerizable composition with parallel light, a significant index of refraction difference is imparted between the two due to the cross link density difference relative to the matrix caused by the columnar structure polymer self-accelerating effect, and the composition distribution caused by reaction diffusion between the columnar structures and the matrix; also, columnar structures with a high aspect ratio extending in the direction of the parallel light, as well as an obvious phase structure, can be formed.

In a preferred embodiment of the present invention, a large number of the optically transmissive regions of the photomask are disposed in a regular lattice. This enables the manufacture of a molded product in which regular columnar structures are formed, half widths are narrow, and a sharp diffraction spot are imparted.

Effect of the Invention

The present invention is a molded product having a phase structure formed by photopolymerization of a photopolymerizable composition, and provides a molded product and manufacturing method thereof for a molded product imparting a sharp diffraction spot at a high diffraction efficiency. Due to those optical characteristics, the molded product above can be used as an optical low-pass filter or the like.

BEST MODE FOR PRACTICING THE INVENTION

Below we discuss an embodiment wherein a molded product of the present invention is used as a film-shaped light diffraction element.

As shown in FIG. 1, molded product 1 contains a phase separation structure comprising a matrix 2, consisting of a thin plate substrate of a photopolymerized composition, and columnar structures 3, consisting of photopolymerized compositions disposed within the matrix 2. The columnar structures 3 have an index of refraction different from that of the matrix 2. The molded product 1 is formed in a film shape with an approximately fixed thickness.

Generally used film shapes are appropriate for the molded product of the present invention as a material for optical use. However, in the molded product of the present invention, the shape thereof can be determined appropriately according to need, therefore it is not limited to film shapes, but may also be formed into other shapes. For example, the molded product may have a shape whereby its thickness varies in the longitudinal direction.

Each of the columnar structures 3 has approximately the same shape, and is disposed in a regular triangle lattice so that the axes thereof extend in the thickness direction of the film-shaped molded product 1. More specifically, the columnar structures 3 have a cylindrical shape with an approximately fixed cross sectional shape in the axial direction; the multiple columnar structures 3 are oriented approximately in parallel such that their axial direction A is the same direction, and the shape of the cross sections thereof perpendicular to the axial direction A are made to be approximately the same.

In the columnar structures 3, the axial direction A and the molded product thickness direction B are set to be approximately the same, but not limited thereto; a specified angle may also be established between these directions A and B. Also, the columnar structures are set to be circular in cross section, but they are not limited thereto, and may also be elliptical, rectangular, or the like.

Multiple columnar structures 3 are arranged in a regular triangle lattice within the plane perpendicular to the axial direction A, but the multiple columnar structures 3 may also be disposed in a specified pattern. The specified pattern may be, for example, any desired lattice shape such as a square lattice shape or the like.

Thus the molded product 1 includes a phase structure comprising a matrix 2 and columnar structures 3 disposed within the matrix 2.
Therefore when light from the plane direction is incident on the molded product 1, the molded product 1 imparts a diffraction spot due to the layout of the columnar structures 3, and functions as a diffraction element.

Next we discuss the method for manufacturing the molded product 1.

To manufacture the molded product 1, a photopolymerizable composition 20 is injected into a mold 10, and then a photomask 40 is disposed between an irradiation light source 30 and the mold 10 (see FIGS. 2 through 6). Thereafter, light from the irradiation light source 30 is directed at and irradiated onto the photopolymerizable composition 20 in the mold 10; the photomask 40 is removed and light from the irradiation light source 30 is further directed at and irradiated onto the photopolymerizable composition 20 in the mold 10. Photopolymerization of the photopolymerizable composition 20 is thus completed. By removing the now completely polymerized photopolymerizable composition 20 from the mold 10, the molded product 1 transparent to the intended usage wavelengths can be obtained.

(Mold)

Referring to FIG. 2, we now discuss the mold 10 used in the method for manufacturing the molded product 1. FIGS. 2(*a*) and (*b*) are respectively a plan view and a cross section of the mold 10 into which the photopolymerizable composition 20 is filled.

The mold 10 comprises a main unit 11 having a space portion (concavity) 11*a*, and a cover piece 12 covering the space portion 11*a*. By covering the main unit 11 with the cover piece 12, a cavity defined by the space portion 11*a* is formed inside the mold 10. As will be discussed below, the photopolymerizable composition 20 is injected into this cavity and held there. It is desirable that the photopolymerizable composition 20 filled into the cavity not contact external air, so as to avoid inhibition of polymerization by oxygen. For this reason, the mold 10 can fluid-seal the photopolymerizable composition 20.

To form the film-shaped molded product 1, the space portion 11*a* of the main unit 11 creates a thin film or thin plate-shaped space. However, the space portion 11*a* can be given a variety of shapes according to the shape of the molded product 1 being formed.

Since the cover piece 12 is disposed on the light irradiation side when manufacturing the molded product 1, a light-transmissive material with low optical absorption of the irradiation light source wavelength is used; average thickness is 150 μm. Specifically, the light-transmissive material is Pyrex (registered trademark) glass, quartz glass, fluorinated (meth)acrylic resin, or the like.

Below we discuss materials usable for the photopolymerizable composition 20.

(Multifunctional Monomers)

It is desirable that a multifunctional monomer be included in the photopolymerizable composition 20. As multifunctional monomers of this type, (meth)acryl monomers containing a (meth)acryloyl group, vinyl groups, and allyl groups and the like are particularly preferable.

Specific examples of multifunctional monomers include triethyleneglycol di(meth)acrylate, polyethylene glycol di(meth)acrylate, neopentylglycol di(meth)acrylate, 1,4-butanediol di(meth)acrylate, 1,6-hexanediol di(meth)acrylate, hydrogenated dicyclopentadienyl di(meth)acrylate, ethylene oxide denatured bisphenol A di(meth)acrylate, trimethylol propane tri(meth)acrylate, pentaerythritol tetra(meth)acrylate, tetramethylolmethane tetra(meth)acrylate, pentaerythritol hexa(meth)acrylate, multifunctional epoxy (meth)acrylate, multifunctional urethane (meth)acrylate, divinylbenzene, triallyl cyanurate, triallyl isocyanurate, triallyl trimellitate, diallyl chlorendate, N,N'-m-phenylenebismaleimide, and diallyl phthalate; these may be used alone in or in blends of two or more.

Among these, multifunctional monomers with three or more polymerizing carbon-carbon double bonds in the molecule lead to large refractive index difference caused by polymerization, making it easier for the above-described columnar structures to form.

Particularly preferred multifunctional monomers having three or more polymerizing carbon-carbon double bonds are trymethylol propane tri(meth)acrylate, pentaerythritol tetra (meth)acrylate, tetramethylol methane tetra(meth)acrylate, and pentaerythritol hexa(meth)acrylate.

When two or more types of multifunctional monomers or oligomers thereof are used as the photopolymerizable composition 20, it is preferable to use polymers whose indexes of refraction as homopolymers differ between one another, and it is more preferable to combine those having greater differences in index of refraction.

In order to assure that functions such as diffraction, polarization, and diffusion are obtained at a high efficiency requires larger refraction index differences; it is preferable that the difference in index of refraction be 0.01 or greater; 0.05 or greater is more preferred. Diffusion of the monomer in the polymerization process causes differences in index of refraction to increase, therefore combinations with a large differential in diffusion constants are preferred.

Note that when using three or more types of multifunctional monomer or oligomer, arrangements should be made so that the index of refraction difference between at least two of the homopolymers falls within the range noted above. In order to obtain functions such as high efficiency diffraction, polarization, and diffusion, it is preferable that the two monomers or oligomers with the greatest difference in index of refraction as homopolymers be used in ratios of between 10:90 and 90:10 by weight.

(Multifunctional Monomers)

Together with the above noted multifunctional monomers and oligomers, monofunctional monomers or oligomers having a single carbon-carbon double bond in the molecule can also be used in the photopolymerizable composition 20. Particularly preferred such monofunctional monomers and oligomers are (meth)acrylic monomers containing a (meth) acryloyl group, and containing a vinyl group, and allyl group, or the like.

Specific examples of monofunctional monomers include acrylate compounds such as methyl (meth)acrylate, tetrahydro furfuryl (meth)acrylate, ethyl carbitol (meth)acrylate, dicyclo pentanyl oxyethyl (meth)acrylate, isobornyl (meth) acrylate, phenyl carbitol (meth)acrylate, nonyl phenoxyethyl (meth)acrylate, 2-hydroxy-3-phenoxy propyl (meth)acrylate, (meth)acryloyloxy ethyl succinate, (meth)acryloyloxy ethyl phthalate, phenyl (meth)acrylate, cyanoethyl (meth)acrylate, tribromophenyl (meth)acrylate, phenoxyethyl (meth)acrylate, tribromo phenoxyethyl (meth)acrylate, benzyl (meth) acrylate, p-bromobenzyl (meth)acrylate, 2-ethylhexyl (meth) acrylate, lauryl (meth)acrylate, trifluoroethyl (meth)acrylate, and 2,2,3,3-tetrafluoropropyl (meth)acrylate; vinyl compounds such as styrene, p-chlorostyrene, vinyl acetate, acrylonitryl, N-vinyl pyrrolidone, and vinylnaphthalene; and allyl compounds such as ethylene glycol bis-allyl carbonate, diallyl phthalate, and diallyl isophthalate.

These monofunctional monomers or oligomers are used to impart flexibility to the molded product 1; a preferred range for their use relative to multifunctional monomers or oligomers is 10-99% by mass; a more preferred range is 10-50% by mass.

(Polymers, Low Molecular Weight Compounds)

It is also possible in the photopolymerizable composition 20 to use uniformly dissolving mixtures containing compounds which do not have polymerizing carbon-carbon double bonds with the multifunctional monomers or oligomers.

Examples of compounds which do not have polymerizing carbon-carbon double bonds include polymers such as polystyrene, polymethyl (meth)acrylate, polyethylene oxide, polyvinylpyrrolidone, polyvinyl alcohol, and nylon; low molecular weight compounds such as toluene, n-hexane, cyclohexane, acetone, methyl ethyl ketone, methyl alcohol, ethyl alcohol, ethyl acetate, acetonitryl, dimethyl acetone amide, dimethylformamide, tetrahydrofuran; and additives such as organic halogen compounds, organic silicon compounds, plasticizers, and stabilizers.

Compounds like this which do not have polymerizing carbon-carbon double bonds are used for such purposes as adjusting the viscosity of the photopolymerizable composition 20 when manufacturing the molded product 1 in order to make easier to handle, or reducing the monomer component ratio in the photopolymerizable composition 20 to improve polymerization degree; the amount used thereof is preferably in a range of 1-99% by mass of the total amount of multifunctional monomer or oligomer, and more preferably in a range of 1-50% by mass thereof, in order to improve handling qualities while forming columnar structures with a regular arrangement.

(Photoinitiator)

There is no particular limitation as to photoinitiators used in the photopolymerizable composition 20, so long as the initiator is one normally used for photopolymerization in which polymerizing is done by irradiating with an active energy beam such as ultraviolet or the like. Examples include benzophenone, benzyl, Michler's ketone, 2-chlorothioxanthone, benzoine ethyl ether, dietoxyacetophenone, p-t-butyl trichloroacetophenone, benzyl dimethyl ketal, 2-hydroxy-2-methyl propyl phenone, 1-hydroxycyclohexyl phenyl ketone, and 2-benzyl-2-dimethylamino-1-(4-morpholinophenyl)-butanon-1, dibenzo suberon.

A preferred range for use of these photoinitiators relative to the weight of other photopolymerizable compositions is 0.001-10% by mass; a more preferred range in order to avoid loss of transparency of the molded product 1 is 0.01-5% by mass.

Referring to FIGS. 3 through 6, we now discuss other equipment used in the method for manufacturing the molded product 1.

(Photomask)

In the molded product 1, multiple columnar structures 3 with indexes of refraction different from that of the matrix 2 are oriented in the same direction within the matrix 2; the columnar structures 3 are disposed in a certain pattern within a plane perpendicular to this orientation direction. This pattern can be determined as desired using texturing from the photomask 40.

In the present embodiment, texturing is used as a method for determining the position of the columnar structures 3. The texturing referred to here is a method for imparting a high level of regularity to the columnar structures 3 to be formed by pre-inputting position information.

A photomask used for photolithography or the like can be used as the photomask 40. There is no particular rule regarding the size, pitch, or shape of mask hole patterns or hole diameters, but if the mask holes are circular, the hole diameter is preferably 80 nm-10 µm, and pitch is preferably 120 nm-15 µm.

As shown in FIG. 3, the photomask 40 is one in which mask holes 41 are regularly arranged in a triangular lattice pattern. The mask holes 41 may be arranged in other patterns, not limited to the above. For example, as shown in FIG. 4, a photomask 40 may be used in which the mask holes 41 are regularly arranged in a square lattice pattern.

Note that in the present embodiment, although texturing by the photomask 40 is used to form the columnar structures 3, there is no limitation thereto, and position information may also be input using scanning irradiation with laser light from a visible or ultraviolet region wavelength band, or X rays, or γ rays or the like.

(Irradiation Light Source)

A [source] capable of irradiating the mold 10 with parallel light such as ultraviolet or the like is used for the irradiation light source 30 (see FIG. 6). The degree of parallelness of irradiated light is preferably such that the spreading angle is ±0.03 rad or less, and more preferably ±0.001 rad or less.

In addition to the ability to irradiate with parallel light, the light source used for the irradiation light source 30 is capable of keeping the parallel light intensity distribution essentially uniform within the vertical cross section relative to the direction of advance of the irradiated parallel light. Specifically, a light source in which parallel light from a point light source or a stick light source has an essentially uniform light intensity distribution (hat shaped distribution) using a mirror or lens or the like, or a planar light source such as a VCSEL, can be used as the irradiation light source 30.

Note that laser light is preferable from the standpoint of parallelness, but due to its Gaussian distribution of light intensities, it is preferably used with an appropriate filter or the like to make the distribution of light intensity essentially uniform.

In other words, for the molded product 1 it is necessary to advance the polymerization reaction uniformly in a plane perpendicular to the film thickness direction B of the molded product 1 in order to arrange the columnar structures 3 with a high degree of regularity. For this reason, the light intensity distribution of the irradiation light source 30 is set to be essentially uniform within the irradiation range.

In the irradiation light source 30, as shown in FIG. 5, an irradiation area 31 is divided into multiple regions (9 regions in the present embodiment); the light intensity is measured at points $31a$-$31i$ in each region, and 2.0% or below is used as the value for illumination level distribution given by Expression (2). More preferably, a value of 1.0% or below is used.

Illumination level=(max. value−min. value)/(max value+min. value)×100　　(2)

(Light Irradiation)

In the method for manufacturing the molded product 1, light irradiation is implemented using two light irradiation steps, comprising a first light irradiation step and a second light irradiation step.

(First Light Irradiation Step)

In the first light irradiation step, as shown in FIG. 6(a), a photomask 40 for determining the forming positions of the columnar structures 3 is first disposed on the top portion of the mold 10 filled with the photopolymerizable composition 20 (i.e., between the mold 10 and the irradiation light source 30). At this point, the photomask 40 is disposed essentially parallel to the top surface of the mold 10 (cover piece 12). To more precisely control the circle diameter and pitch of the columnar structures, it is preferable that the distance from the uppermost surface of the photopolymerizable composition 20 to the photomask 40 is 2 mm or less, and more preferably, 200 μm or less. In the method for determining a forming position using a photomask, attention must be paid to the point at which ultraviolet light is diffracted at the mask aperture. Diffraction can cause the forming position to be set in a pattern different from the photomask, or cause the pattern to degrade too greatly so that the forming position cannot be determined; the distance between the photomask and the photopolymerizable composition must therefore be accurately determined.

Next, after positioning the photomask 40, parallel light such as ultraviolet light or the like, having a wavelength full width at half maximum of 100 nm or less in the irradiation range and an essentially uniform light intensity distribution, is irradiated from the irradiation light source 30. This results in the irradiation of a specified pattern in the photopolymerizable composition 20 caused by parallel light passing through the photomask 40. Thus, in the first light irradiation step, ultraviolet light or the like is irradiated as parallel light until the photopolymerizable composition 20 polymerizes to a gel state, thereby determining the forming positions of the columnar structures 3 within the molded product 1.

Specifically, in the first light irradiation step, the photopolymerizable composition 20 is irradiated until its polymerization degree is in the range of 10%-80%, and more preferably until it is in a range of 20%-60%, in order to accomplish the twin goals of regularity and high diffraction efficiency in the columnar structures 3 of the manufactured molded product 1.

In the present embodiment, in the Photo-DSC method, the state in which the photopolymerizable composition 20 has completely reacted so that no further heat is emitted even if irradiated with light is considered a 100% of polymerization degree. In the first light irradiation step, a specified amount of is irradiated on the photopolymerizable composition 20 until the polymerization degree calculated from the calorific value in the Photo-DSC method reaches a specified polymerization degree (10%-80%).

(Second Light Irradiation Step)

Following the first light irradiation step, in the second light irradiation step shown in FIG. 6(b) the photomask 40 is removed, and the mold 10 is further irradiated with parallel light having a wavelength full width at half maximum of 100 nm or less and an essentially fixed light intensity distribution. Parallel light is thus irradiated onto the entirety of the photopolymerizable composition 20; each of forming sites of the columnar structure 3 and the matrix 2 which were predetermined in the first light irradiation step are formed in the film thickness direction, and the photopolymerizable composition 20 is polymerized completely, while the difference in index of refraction between the matrix 2 and the columnar structures 3 is increased.

At this point, columnar structures 3 are clearly formed by parallel light within the matrix 2, in a way which does not broaden in the planar direction and extends parallel to the film thickness direction. The molded product 1 is thus formed in a way that the change in index of refraction is clearly apparent at the boundary between the matrix 2 and the columnar structures 3. The molded product 1 is manufactured by parting the completely polymerized photopolymerizable composition 20 from the mold 10.

In general, the resolution when exposing light emitted from a point source such as a high pressure mercury lamp or the like and adjusted for illumination level uniformity and parallelness by mirrors or lenses on a photomask is as follows. For a photomask slit width a and a gap L, light passing through the slit is approximated by Fresnel diffraction for the case when the size of a is non-negligible relative to L (when the values a and L are close); when the size of a is negligible relative to L, on the other hand (a<<L), it is approximated by Fraenhofer diffraction. When the degradation of the image caused by diffraction is represented by the function F in Expression (3), the resolution limit appears near an F of 2. λ is the wavelength of light.

$$F=a(2/\lambda L)^{1/2} \quad (3)$$

From Expression (3), we obtain a=0.89 $L^{1/2}$ for the case when F=2 and λ=0.4. The term a is the resolving limit line width. If L is assumed to be the 150 μm average thickness of the cell upper portion cover piece 12, resolution is 10.9 μm. Therefore the hole diameter of the columnar structures is 80 nm-10 μm, so even if one only attempts to form the columnar structures using a photomask, image degradation caused by Fraenhofer diffraction (a<<L) is severe, and it is inconceivable that columnar structures with an aspect ratio of 10 or greater would form in a system of this type.

In other words, when columnar structures are completely formed using only a first light irradiation step, as was conventionally the case, light passing through the photomask spreads due to diffraction from the mask hole projection region (i.e. the columnar structure region) to the matrix region. This is why even when a second light irradiation step is carried out, as is conventionally done after the first light irradiation step, a significant difference in index of refraction does not arise between the matrix and the columnar structures.

However, in the present embodiment the first light irradiation step does not cause completely polymerizing of the columnar structures 3; it only affixes the forming position. In the second light irradiation step, the entire [piece] is made to polymerize completely by irradiating parallel light onto the entire [piece], which is in an incompletely polymerized state, with some difference between the polymerization degree of the matrix 2 and the columnar structures 3. At this point a significant difference in index of refraction is imparted between the two by the difference in cross linking density between the columnar structures 3 and the matrix 2 due to the polymer auto-acceleration effect, and by composition distribution due to reaction diffusion between the columnar structures 3 and the matrix 2. It is also possible to form columnar structures 3 with a high aspect ratio extending approximately parallel to the thickness direction of the molded product 1.

Evaluation of the molded product 1 was implemented as follows.

(Calculation of Diffraction Efficiency)

A laser beam with a standard normal intensity distribution was irradiated onto a manufactured molded product 1 and the intensity of the diffraction spot measured; a value obtained by dividing the measured intensity of the diffraction spot by the intensity of the entire incident light was calculated as the diffraction efficiency of the molded product 1. When multiple diffraction spots appear, the value of the total intensity of those spots divided by the entire incident light is used.

In the present embodiment, the molded product 1 diffraction efficiency was 10% or greater (10%≦diffraction efficiency≦100%).

(Angular Spectrum)

As shown in FIG. 7, a laser beam 52 with a standard normal intensity distribution from a laser light source 51 was made perpendicularly incident to the surface of the molded product 1, and the transmitted light intensity from the molded product 1 was measured by a photodiode 54 while varying the angle θ of the photodiode 54 with respect to the molded product 1 by angle varying means 53. Assuming that the point at which the directly advancing point of the transmitted incident laser beam 52 is at 0°, that the horizontal axis has is at an angle θ, and that the vertical axis is described using light intensity, an angular spectrum such as that shown in FIG. 8 is obtained. The half width of the diffraction spot was obtained from this angular spectrum. The higher the regularity of the columnar structure is arranged, the smaller the half width of the peak.

In the present embodiment, the half width of the diffraction spot obtained from the angular spectrum for the molded product 1 was 0.6° (0°<half width ≦0.6°).

(Optical Low Pass Filter)

The molded product 1 may also be used for an optical low pass filter. In image capture systems such as digital cameras and the like, moiré (false color) frequently presents problems. This occurs because CCD or CMOS sensors are regularly arranged, and therefore create interference with regular patterns included in the imaged object. One means of resolving this problem is to introduce an optical low pass filter. An optical low pass filter reduces the effect of interference by separating incident light at multiple points, thereby suppressing moiré.

To use the molded product 1 as an optical low pass filter, an optical laminate is formed by laminating transparent optical elements (e.g. transparent film or the like) onto the molded product 1, or by forming the molded product 1 as one piece with a supporting glass substrate. This optical laminate diffracts incident light at a specific position and intensity, and can therefore function as an optical low pass filter by appropriately setting the diffraction angle and diffraction efficiency of the optical laminate, as well as the distance relative to the sensor described above.

In a Wafer Level Chip Size Package (WL-CSP), which is one method of fabricating a sensor, a protective glass for protecting a sensor on a silicon substrate is laminated on using an adhesive layer. Using an optical laminate as the WL-CSP protective glass facilitates setting the distance with respect to the sensor, and enables the introduction of an optical low pass filter to the sensor without losing the advantages of WL-CSP's small size and high throughput advantages. This method makes it easy to set the distance between the optical laminate and the sensor using the thickness of the adhesive layer, and to implement an optical low pass filter without increasing the thickness of the optics as a whole.

After forming an optical laminate with a large surface area in which the molded product 1 and the glass are formed as a single piece, this laminate may be cut into specified sizes, and optical laminates cut to the specified size may be used as protective glass on the sensor pieces.

Note that if the molded product 1 can be arranged in the optical system, an optically transparent optical element does not necessarily have to be laminated onto the molded product 1.

As an example, imaging optics 50 using a molded product 1 are shown in FIG. 9. These imaging optics 50 comprise a sensor 51, which is a fixed imaging element, an optical laminate 52, and a lens 53. In this example, the optical laminate 52 is constituted by forming the molded product 1 and a glass substrate 4 as a single piece; this is used as an optical low pass filter. This optical laminate 52 is affixed to the light receiving surface of the sensor 51 by an adhesive layer 6 disposed on the outside edge portion thereof. A gap layer of a specified thickness is thus formed between the optical laminate 52 and the sensor 51. This gap layer is an air layer.

Note that in the FIG. 9 example, the adhesive layer 6 is disposed only on the outside edge portion of the optical laminate 52, but it is not limited thereto, and an adhesive layer may be disposed over the entire optical laminate 52, affixing the optical laminate 52 and the sensor 51. In that case, the gap layer is the adhesive layer.

(Silane Coupling)

A method for forming the molded product 1 as a single piece with the glass substrate is to adhere the two using a silane coupling agent. There is no particular limitation on what can be used as the silane coupling agent so long is it is a compound having both a reaction site for bonding with an inorganic component such as glass (e.g. a site producing an ethanol group by hydrolysis), and a site reacting with an organic component (e.g. functional groups such as a (meth) acryloyl group, epoxy group, vinyl group, or amino group). A glass substrate which has been surface treated in advance with a silane coupling agent may also be used, and a silane coupling agent may also be incorporated into the photopolymerizable composition.

(Infrared Blocking Function)

The glass substrate is not particularly limited to inorganic glass or the like generally in use, but because a luminosity factor correction is required when using CCDs or the like as a sensor, it is preferable to have a function for blocking light in the near infrared region.

An infrared blocking functionality can also be imparted to the molded product by adding an infrared absorption agent to the photopolymerizable composition.

(Anti-Reflective Measures)

To use the molded product 1 as an optical low pass filter, it is preferable that the surface has an anti-reflective capability. Examples of anti-reflective treatment are electron beam lithography, as well as a method for forming fine bump structures by stamping, using anodized porous aluminum or the like.

An anti-reflective film may also be formed on surfaces by using a coating to impart anti-reflective capability.

Below we discuss the present invention more specifically using embodiments.

First Embodiment

In a first embodiment, a photopolymerizable composition was obtained by dissolving 0.6 mass parts of 1-hydroxycyclohexyl phenyl ketone in a mixture of 30 mass parts phenoxyethyl acrylate and 70 mass parts trimethylolpropane trimethacrylate.

The photopolymerizable composition obtained was inserted as a 20 mm $\phi$, 0.2 mm thick film into a glass cell. The glass was given a thickness of 150 μm on the irradiation side. Next, a photomask on which 2 μm $\phi$ light-transmissive regions were arranged at a 5 μm pitch in a hexagonal lattice (triangular lattice) was disposed on the top portion of the glass cell, and ultraviolet parallel light with an essentially uniform light intensity distribution was irradiated thereon from a direction perpendicular to the surface, at 840 mJ/cm². The polymerization degree of the photopolymerizable composition at this point was 40%.

Thereafter the photomask was removed, ultraviolet parallel light was further irradiated at 6300 mJ/cm², the photopolymerizable composition was polymerized, and a plastic film was obtained.

FIG. 10 shows an optical micrograph of the plastic film obtained. It was confirmed from this observed image that the columnar structures were regularly arranged in the manufactured plastic film.

An evaluation was made of the diffraction pattern by irradiating the plastic film from a perpendicular direction with a laser beam having a half width intensity distribution of 0.5°. FIG. 11 shows the observed image of diffraction points caused by the regular phase structure inside the polymer. From the angular spectrum of the diffraction image, the angular width (half width) at the first order diffraction points was good, at 0.5°. Diffraction efficiency was also good, at 75%.

Second Embodiment

In a second embodiment, the polymerization degree in the first embodiment and the first light irradiation step were varied, and polymerization degree was set at the upper limit value (80%).

In the second embodiment, the same photopolymerizable composition as in the first embodiment was inserted as a 20 mm φ, 0.2 mm thick film into a glass cell. The glass was given a thickness of 150 μm on the irradiation side. Next, a photomask on which 2 μm φ light-transmissive regions were arranged at a 5 μm pitch in a hexagonal lattice was disposed on the top portion of the glass cell, and ultraviolet parallel light with an essentially uniform light intensity distribution was irradiated thereon from a direction perpendicular to the surface, at 1400 mJ/cm². The polymerization degree of the photopolymerizable composition at this point was 80%.

Thereafter the photomask was removed, ultraviolet parallel light was further irradiated at 6300 mJ/cm², the photopolymerizable composition was polymerized, and a plastic film was obtained.

As in the first embodiment, an evaluation was made of the diffraction pattern by irradiating the obtained plastic film from a perpendicular direction with a laser beam having a half width intensity distribution of 0.5°, and diffraction points caused by the regular phase structure inside the polymer were observed. From the angular spectrum of the diffraction image, the angular width (half width) at the first order diffraction points was 0.5°. Diffraction efficiency was 60%.

It was thus found that compared to the first embodiment, the half width of the diffraction spot in the second embodiment was good, being approximately the same, and the diffraction efficiency was slightly inferior, but still good at 10% or greater.

Note that the polymerization degree in first light irradiation step was set at the upper limit value of 80% in the second embodiment, but even when set at the lower limit value of 10%, a diffraction spot having a half width of 0.5—approximately the same as the first embodiment—was observed, and a good value for diffraction efficiency of 10% or above was confirmed.

Third Embodiment

In a third embodiment, the polymerization degree in the first embodiment and the first light irradiation step were varied, and polymerization degree was set at a near upper limit value (75%), while the pattern of light-transmissive regions on the photomask was also varied (6 μm φ, 12 μm pitch).

In the third embodiment, the same photopolymerizable composition as in the first embodiment was inserted as a 20 mm φ, 0.2 mm thick film into a glass cell. The glass was given a thickness of 150 μm on the irradiation side. Next, a photomask on which 6 μm φ light-transmissive regions were arranged at a 12 μm pitch in a hexagonal lattice was disposed on the top portion of the glass cell, and ultraviolet parallel light with an essentially uniform light intensity distribution was irradiated thereon from a direction perpendicular to the surface, at 1260 mJ/cm². The polymerization degree of the photopolymerizable composition at this point was 75%.

Thereafter the photomask was removed, ultraviolet parallel light was further irradiated at 6300 mJ/cm², the photopolymerizable composition was polymerized, and a plastic film was obtained.

As in the first embodiment, an evaluation was made of the diffraction pattern by irradiating the obtained plastic film from a perpendicular direction with a laser beam having a half width intensity distribution of 0.5°, and diffraction points caused by the regular phase structure inside the polymer were observed. From the angular spectrum of the diffraction image, the angular width (half width) at the first order diffraction points was 0.5°. Diffraction efficiency was 30%.

It was thus found that compared to the first embodiment, the half width of the diffraction spot in the third embodiment was good, being approximately the same, and the diffraction efficiency was slightly inferior, but still good at 10% or greater.

Fourth Embodiment

In a fourth embodiment, polymerization degree was approximately the same as in the first embodiment and the first light irradiation step (40%), but the pattern of the photomask light-transmissive regions was changed to one of a square lattice.

In the fourth embodiment, the same photopolymerizable composition as in the first embodiment was inserted as a 20 mm φ, 0.2 mm thick film into a glass cell. The glass was given a thickness of 150 μm on the irradiation side. Next, a photomask on which 2 μm φ light-transmissive regions were arranged at a 5 μm pitch in a square lattice was disposed on the top portion of the glass cell, and ultraviolet parallel light with an essentially uniform light intensity distribution was irradiated thereon from a direction perpendicular to the surface, at 840 mJ/cm². The polymerization degree of the photopolymerizable composition at this point was 30%.

Thereafter the photomask was removed, ultraviolet parallel light was further irradiated at 6300 mJ/cm², the photopolymerizable composition was polymerized, and a plastic film was obtained.

As in the first embodiment, an evaluation was made of the diffraction pattern by irradiating the obtained plastic film from a perpendicular direction with a laser beam having a half width intensity distribution of 0.5°, and diffraction points caused by the regular phase structure inside the polymer were observed. From the angular spectrum of the diffraction image, the angular width (half width) at the first order diffraction points was 0.5°. Diffraction efficiency was 58%.

It was thus found that compared to the first embodiment, the half width of the diffraction spot in the fourth embodiment was good, being approximately the same, and diffraction efficiency was slightly inferior, but still good at 10% or greater.

Fifth Embodiment

A fifth embodiment was an example implemented in the same conditions as the first embodiment, except that the photomask was arranged at 50 μm above the glass on the irradiation surface side.

In the fifth embodiment, the same photopolymerizable composition as in the first embodiment was encapsulated as a 20 mm φ, 0.2 mm thick film into a glass cell. The glass was given a thickness of 150 μm on the irradiation side. Next, a photomask on which 2 μm φ light-transmissive regions were arranged at a 5 μm pitch in a hexagonal lattice was disposed at 50 μm above the glass on the irradiation surface side, and ultraviolet parallel light with an essentially uniform light intensity distribution was irradiated thereon from a direction perpendicular to the surface, at 840 mJ/cm$^2$. The polymerization degree of the photopolymerizable composition at this point was 40%.

Thereafter the photomask was removed, ultraviolet parallel light was further irradiated at 6300 mJ/cm$^2$, the photopolymerizable composition was polymerized, and a plastic film was obtained.

As in the first embodiment, an evaluation was made of the diffraction pattern by irradiating the obtained plastic film from a perpendicular direction with a laser beam having a half width intensity distribution of 0.5°, and diffraction points caused by the regular phase structure inside the polymer were observed. From the angular spectrum of the diffraction image, the angular width (half width) at the first order diffraction points was 0.5°. Diffraction efficiency was 77%.

It was thus found that both the half width of the diffraction spot and the diffraction efficiency in the fifth embodiment were good as the ones in the first embodiment.

Sixth Embodiment

A sixth embodiment was an example implemented in the same conditions as the first embodiment, except that the photomask was arranged at 100 μm above the glass on the irradiation surface side.

In the sixth embodiment, the same photopolymerizable composition as in the first embodiment was encapsulated as a 20 mm φ, 0.2 mm thick film into a glass cell. The glass was given a thickness of 150 μm on the irradiation side. Next, a photomask on which 2 μm φ light-transmissive regions were arranged at a 5 μm pitch in a hexagonal lattice was disposed at 100 μm above the glass on the irradiation surface side, and ultraviolet parallel light with an essentially uniform light intensity distribution was irradiated thereon from a direction perpendicular to the surface, at 840 mJ/cm$^2$. The polymerization degree of the photopolymerizable composition at this point was 40%.

Thereafter the photomask was removed, ultraviolet parallel light was further irradiated at 6300 mJ/cm$^2$, the photopolymerizable composition was polymerized, and a plastic film was obtained.

As in the first embodiment, an evaluation was made of the diffraction pattern by irradiating the obtained plastic film from a perpendicular direction with a laser beam having a half width intensity distribution of 0.5°, and diffraction points caused by the regular phase structure inside the polymer were observed. From the angular spectrum of the diffraction image, the angular width (half width) at the first order diffraction points was 0.5°. Diffraction efficiency was 20%.

It was thus found that compared to the first embodiment, the half width of the diffraction spot in the sixth embodiment was good, being approximately the same, and diffraction efficiency was slightly inferior, but still good at 10% or greater.

Seventh Embodiment

A seventh embodiment was an example implemented in the same conditions as the first embodiment, except that the photomask was arranged at 1 mm above the glass on the irradiation surface side.

In the seventh embodiment, the same photopolymerizable composition as in the first embodiment was encapsulated as a 20 mm φ, 0.2 mm thick film into a glass cell. The glass was given a thickness of 150 μm on the irradiation side. Next, a photomask on which 2 μm φ light-transmissive regions were arranged at a 5 μm pitch in a hexagonal lattice was disposed at 1 mm above the glass on the irradiation surface side, and ultraviolet parallel light with an essentially uniform light intensity distribution was irradiated thereon from a direction perpendicular to the surface, at 840 mJ/cm$^2$. The polymerization degree of the photopolymerizable composition at this point was 45%.

Thereafter the photomask was removed, ultraviolet parallel light was further irradiated at 6300 mJ/cm$^2$, the photopolymerizable composition was polymerized, and a plastic film was obtained.

As in the first embodiment, an evaluation was made of the diffraction pattern by irradiating the obtained plastic film from a perpendicular direction with a laser beam having a half width intensity distribution of 0.5°, and diffraction points caused by the regular phase structure inside the polymer were observed. From the angular spectrum of the diffraction image, the angular width (half width) at the first order diffraction points was 0.5°. Diffraction efficiency was 15%.

It was thus found that compared to the first embodiment, the half width of the diffraction spot in the seventh embodiment was good, being approximately the same, and diffraction efficiency was slightly inferior, but still good at 10% or greater.

Comparative Example 1

In Comparative Example 1, in contrast to the first embodiment, no first light irradiation step was conducted using a photomask (i.e., the polymerization degree in the first light irradiation step was 0%), and only the second light irradiation step was carried out.

In Comparative Example 1, the same photopolymerizable composition as in the first embodiment was inserted as a 20 mm φ, 0.2 mm thick film into a glass cell. The glass was given a thickness of 150 μm on the irradiation side. Next, ultraviolet parallel light with an essentially uniform light intensity distribution was irradiated thereon from a direction perpendicular to the surface, at 6300 mJ/cm$^2$, the photopolymerizable composition was polymerized, and a plastic film was obtained.

FIG. 12 shows an optical micrograph of the plastic film obtained. It was confirmed from this observed image that the regularity of the columnar structures was lower than plastic film of the first embodiment.

An evaluation was made of the diffraction pattern by irradiating the plastic film from a perpendicular direction with a laser beam having a half width intensity distribution of 0.5°. FIG. 13 shows the observed image of diffraction points caused by the regular phase structure inside the polymer. From the angular spectrum of the diffraction image, the angular width (half width) at the first order diffraction points was 1.3°. Diffraction efficiency was 24%.

It was thus understood that while a diffraction efficiency value of greater than 10% was obtained for Comparative Example 1 compared to the first embodiment, regularity of the phase structure was low, therefore the half width in the angular spectrum of the diffraction spot was greater than 0.6°.

Comparative Example 2

Comparative Example 2 is one in which, in contrast to the first embodiment, polymerization is essentially completed in the first light irradiation step.

In Comparative Example 2, the same photopolymerizable composition as in the first embodiment was inserted as a 20 mm φ, 0.2 mm thick film into a glass cell. The glass was given a thickness of 150 μm on the irradiation side. Next, a photomask on which 2 μm φ light-transmissive regions were arranged at a 5 μm pitch in a hexagonal lattice was disposed on the top portion of the glass cell, and ultraviolet parallel light with an essentially uniform light intensity distribution was irradiated thereon from a direction perpendicular to the surface, at 15 J/cm². The polymerization degree of the photopolymerizable composition at this point was 90%.

Thereafter the photomask was removed, ultraviolet parallel light was further irradiated at 6300 mJ/cm², the photopolymerizable composition was polymerized, and a plastic film was obtained.

When an evaluation was made of the diffraction pattern by irradiating the plastic film from a perpendicular direction with a laser beam having a half width intensity distribution of 0.5°, as in the first embodiment, diffraction points caused by the regular phase structure inside the polymer were observed. From the angular spectrum of the diffraction image, the angular width at the first order diffraction point was 0.5°. Diffraction efficiency was 6%.

It was thus understood that while the diffraction spot half width in Comparative Example 2 was good, being about the same as the first embodiment, the value shown for diffraction efficiency was not good, at under 10%.

Comparative Example 3

A comparative example 3 was an example implemented in the same conditions as the first embodiment, except that the photomask was arranged at 5 mm above the glass on the irradiation surface side.

In Comparative Example 3, the same photopolymerizable composition as in the first embodiment was encapsulated as a 20 mm φ, 0.2 mm thick film into a glass cell. The glass was given a thickness of 150 μm on the irradiation side. Next, a photomask on which 2 μm φ light-transmissive regions were arranged at a 5 μm pitch in a hexagonal lattice was disposed at 5 mm above the glass on the irradiation surface side, and ultraviolet parallel light with an essentially uniform light intensity distribution was irradiated thereon from a direction perpendicular to the surface, at 840 mJ/cm². The polymerization degree of the photopolymerizable composition at this point was 30%.

Thereafter the photomask was removed, ultraviolet parallel light was further irradiated at 6300 mJ/cm², the photopolymerizable composition was polymerized, and a plastic film was obtained.

When an evaluation was made of the diffraction pattern by irradiating the plastic film from a perpendicular direction with a laser beam having a half width intensity distribution of 0.5°, as in the first embodiment, diffraction points caused by the regular phase structure inside the polymer were observed. From the angular spectrum of the diffraction image, the angular width at the first order diffraction point was 0.5°. Diffraction efficiency was 5%.

It was thus understood that while the diffraction spot half width in Comparative Example 3 was good, being about the same as the first embodiment, the value shown for diffraction efficiency was not good, at under 10%.

Eighth Embodiment

Eighth embodiment is an example of a molded product formed as a single piece with a glass substrate. A silane coupling agent dilute solution was prepared by diluting KBM5103 (3-acryloxypropyltrimethoxysilane; Shin-Etsu Chemical Industries) in a 2.0% acetic acid aqueous solution. The surface of a 200 mm φ, 500 μm thick glass substrate was treated with the above-described silane coupling agent to obtain a silane coupling agent-treated glass substrate. A 100 μm thickness of a photopolymerizable composition of the same composition as the first embodiment was coated onto this glass substrate, and a molded product was obtained by covering and sealing the photopolymerizable composition, coated using a polyethylene terephthalate film as a transparent cover piece. Next, a photomask on which 2 μm φ light-transmissive regions were arranged at a 5 μm pitch in a hexagonal lattice was disposed on the top portion of the glass cell, and ultraviolet parallel light with an essentially fixed light intensity distribution was irradiated thereon from a direction perpendicular to the surface, at 840 mJ/cm². The polymerization degree of the photopolymerizable composition at this point was 30%.

Thereafter the photomask was removed, ultraviolet parallel light was further irradiated at 6300 mJ/cm², the photopolymerizable composition was polymerized, the transparent cover piece peeled off, and an optical laminate in which the molded product was formed as a single piece with the glass substrate was obtained.

When an evaluation was made of the diffraction pattern by irradiating the obtained optical laminate from a perpendicular direction with a laser beam having a half width intensity distribution of 0.5°, as in the first embodiment, diffraction points caused by the regular phase structure inside the polymer were observed. From the angular spectrum of the diffraction image, the angular width (half width) at the first order diffraction point was 0.5°. Diffraction efficiency was 75%.

Positioning of the optical low pass filter was easily achieved when this optical laminate was used as an optical low pass filter and mounted on a fixed image sensor through an adhesive layer. It was confirmed that when an imaging optical system was fabricated using a fixed imaging element thus mounted with an optical low pass filter and circular zone plate was imaged, moiré in a region containing a high spatial frequency component was suppressed.

DESCRIPTION OF REFERENCE NUMERALS

Figure 1:
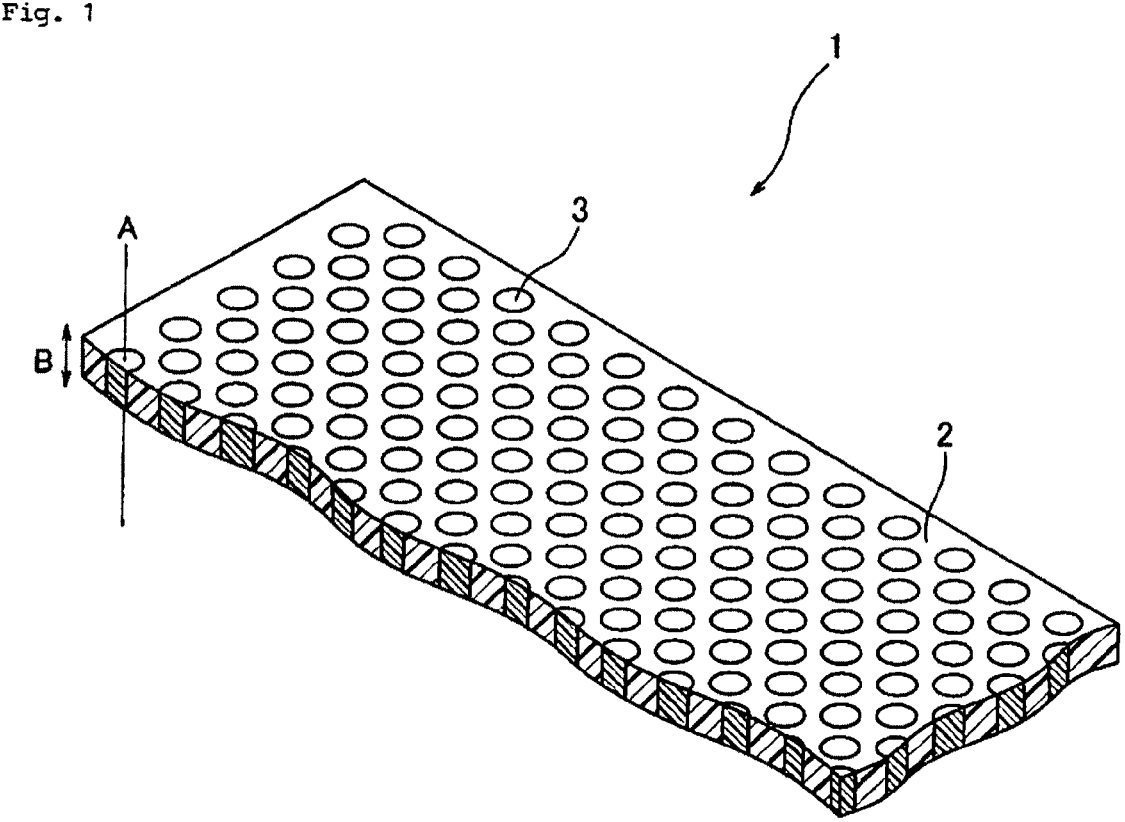
FIG. 1 An overview diagram of the molded product of the present invention.
Figure 2:
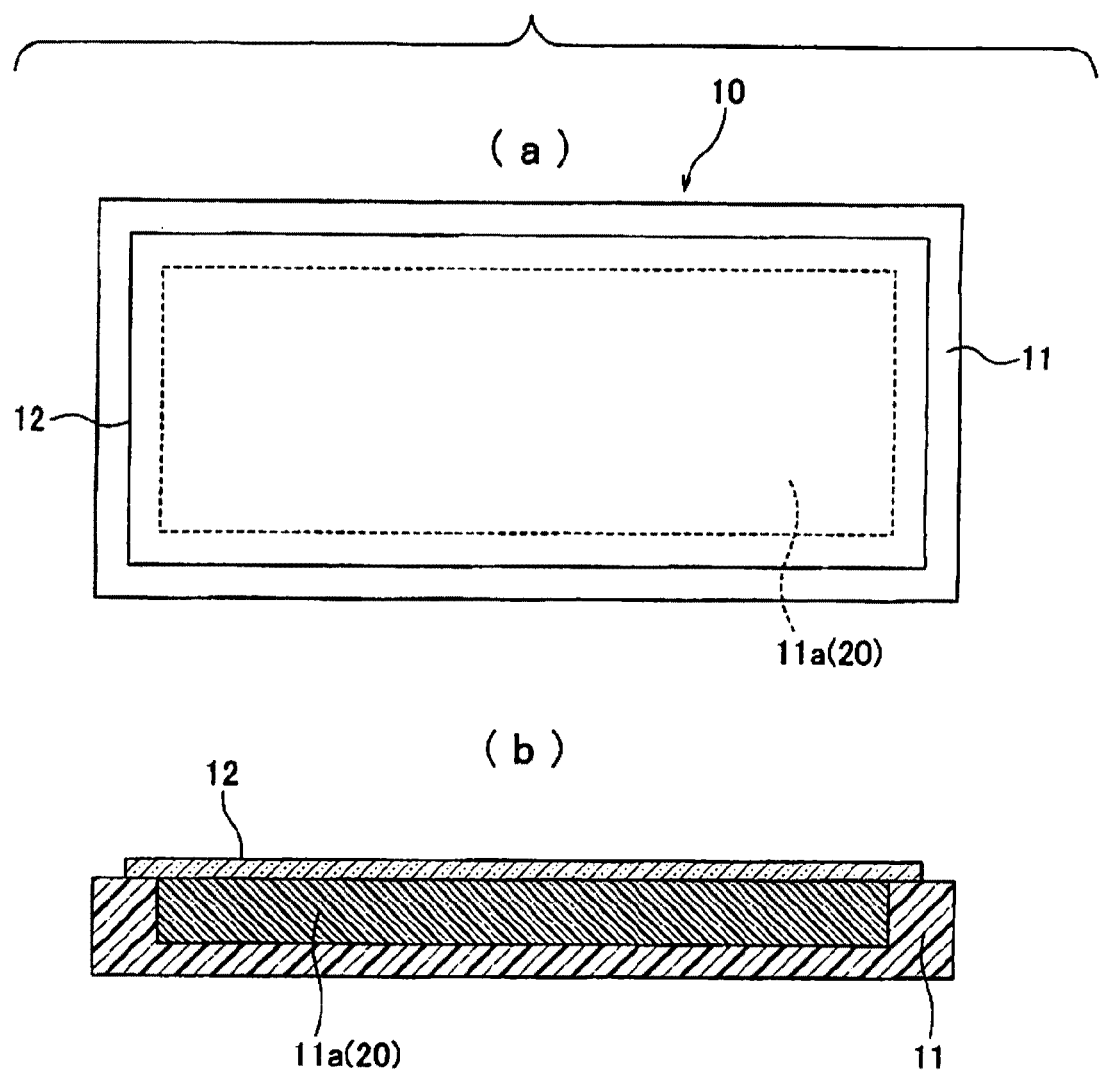
FIG. 2 An explanatory diagram of a mold for manufacturing the molded product of the present invention.
Figure 3:
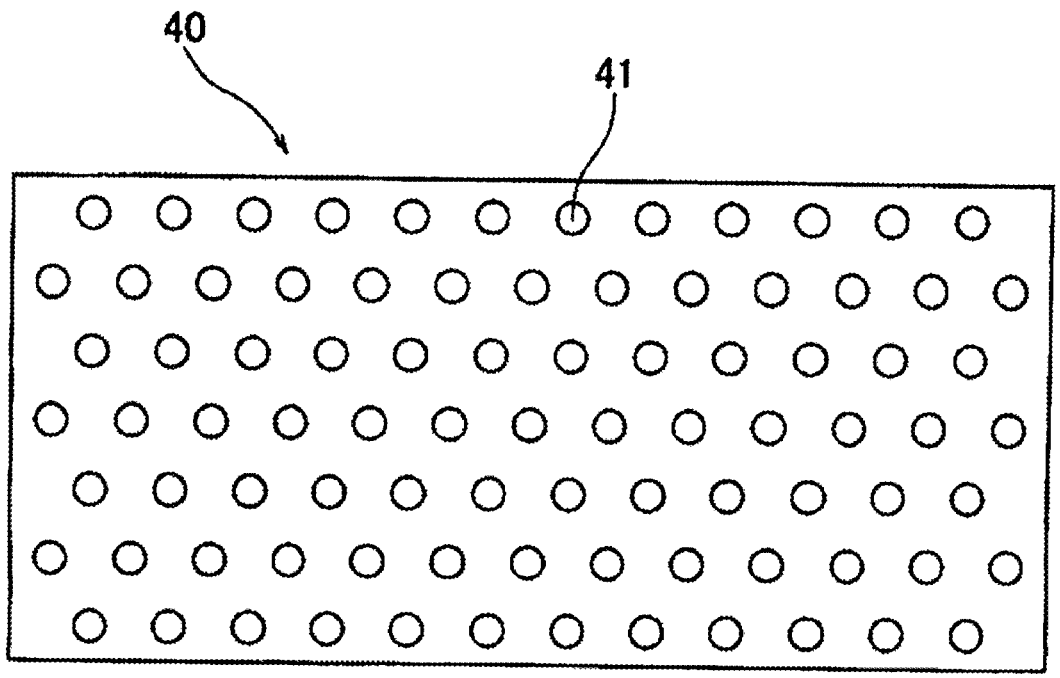
FIG. 3 A plan view of a photomask used in the manufacturing method of the present invention.
Figure 4:
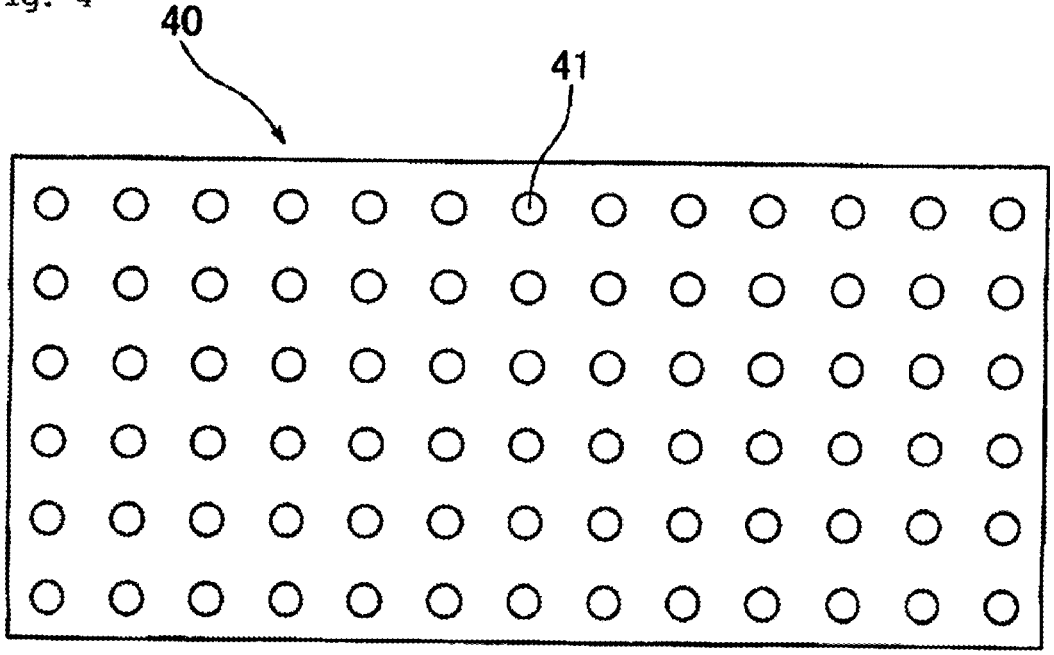
FIG. 4 A plan view of a photomask used in the manufacturing method of the present invention.
Figure 5:
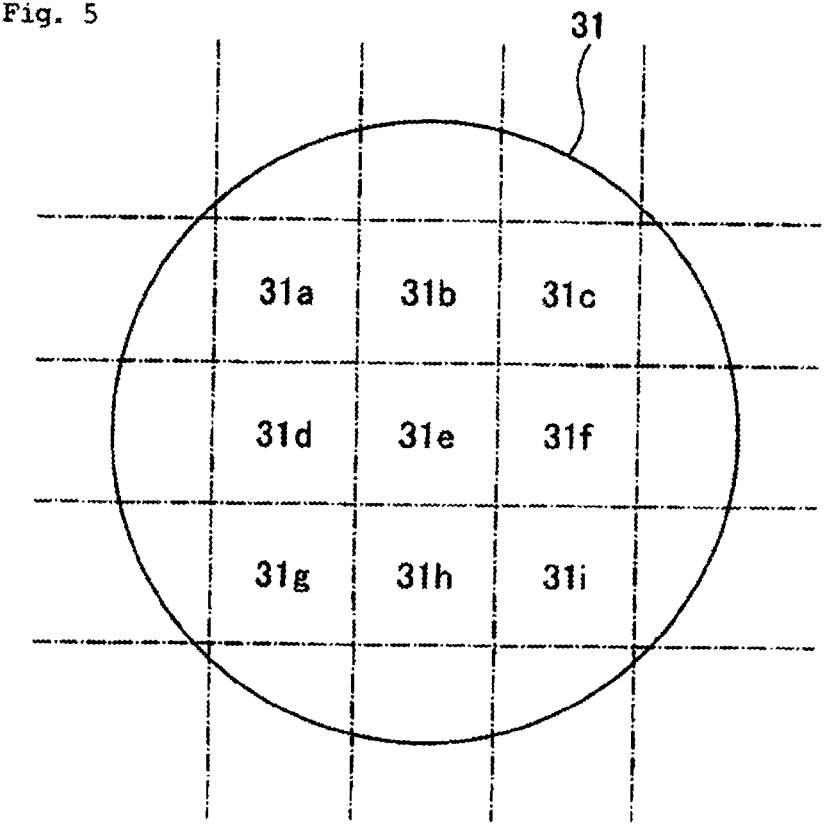
FIG. 5 An explanatory diagram showing the measurement point for the illumination distribution of the irradiation light source used in the manufacturing method of the present invention.
Figure 6:
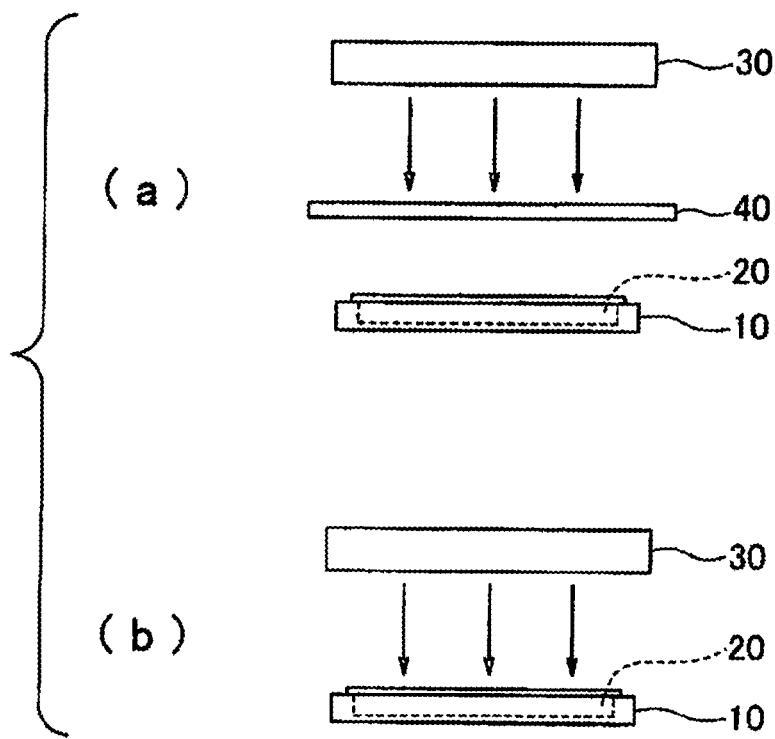
FIG. 6 A diagram explaining the manufacturing method of the present invention.
Figure 7:
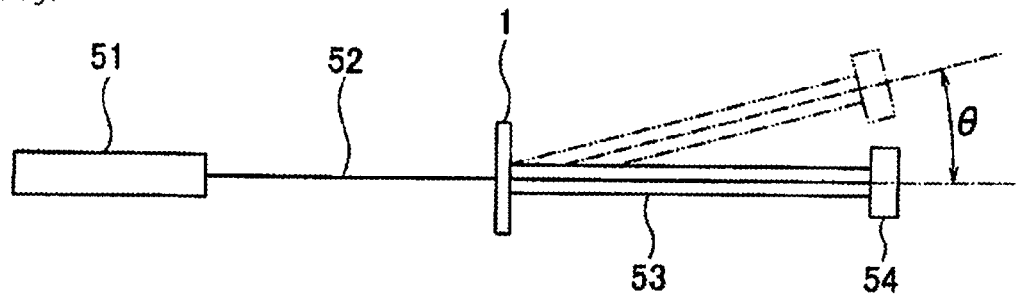
FIG. 7 A summary diagram explaining the method for measuring the laser diffraction angular spectrum of the molded product of the present invention.
Figure 8:
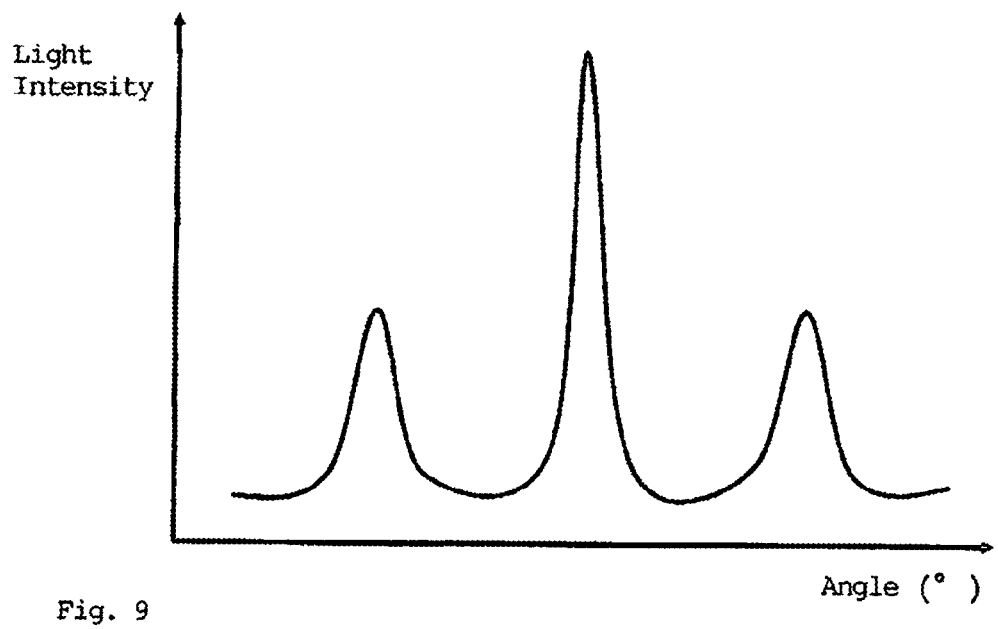
FIG. 8 A graph of the angular spectrum obtained from the molded product of the present invention.
Figure 9:
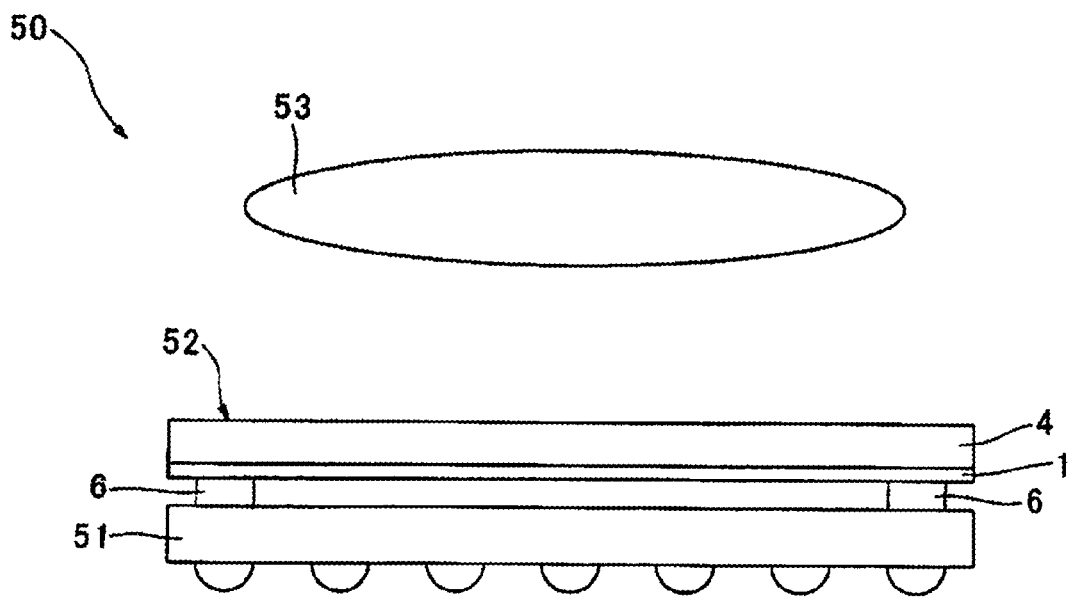
FIG. 9 An explanatory diagram of imaging optics using the molded product of the present invention.
Figure 10:
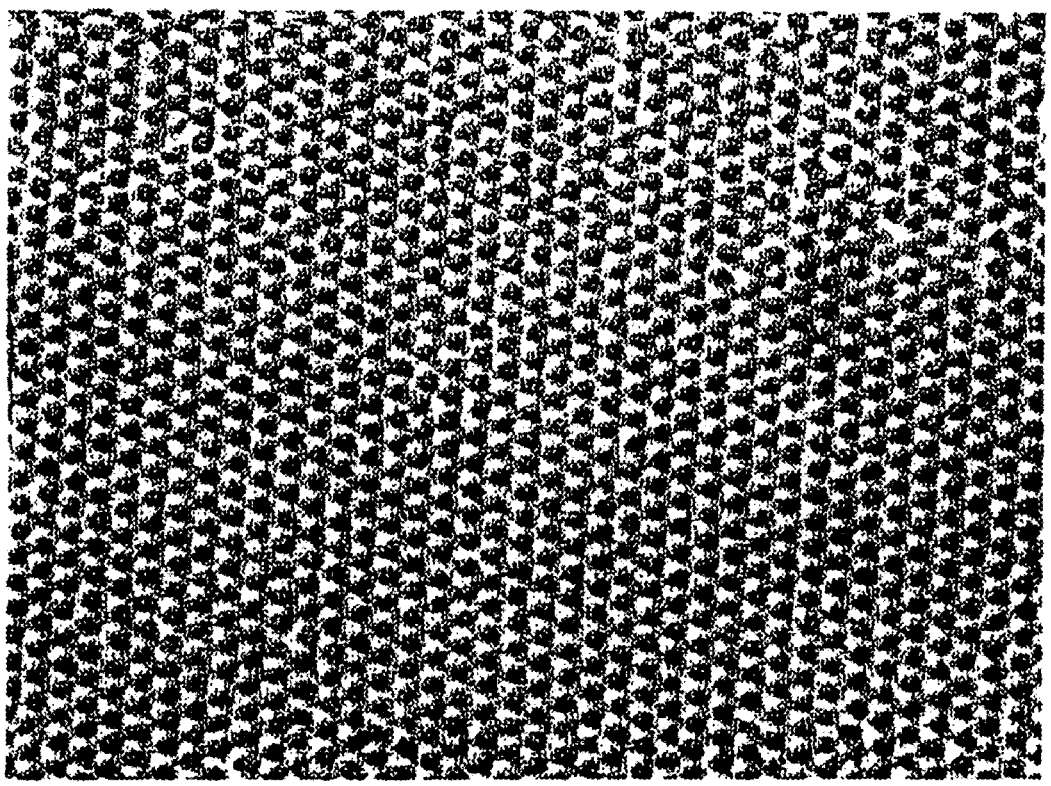
FIG. 10 A diagram showing an optical micrograph of the molded product of the first embodiment.
Figure 11:
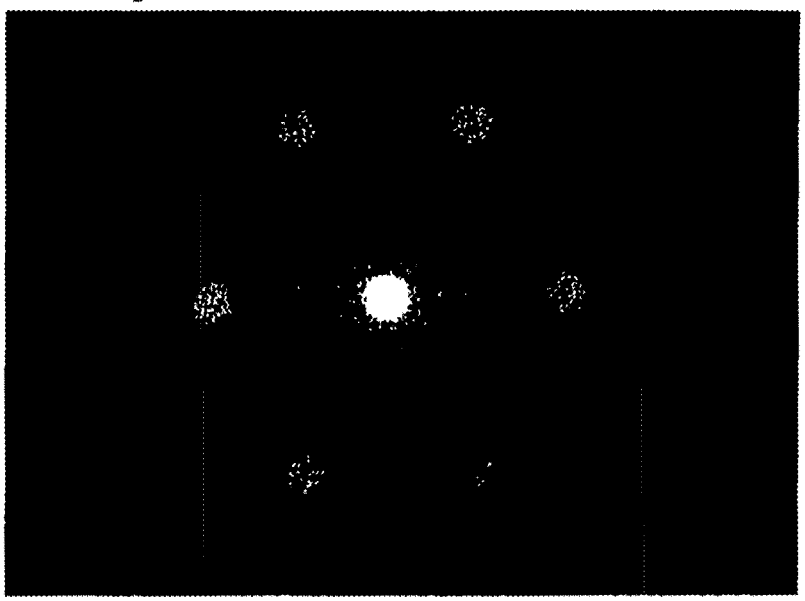
FIG. 11 A diagram showing a laser diffraction image using the molded product of the first embodiment.
Figure 12:
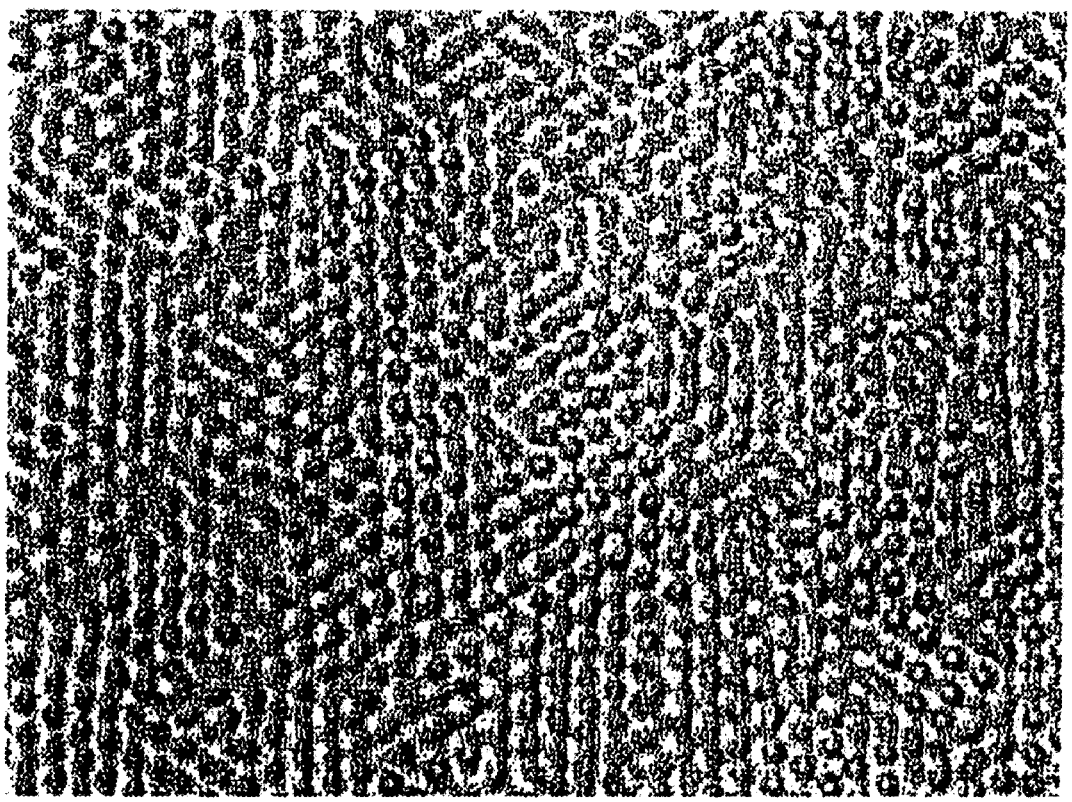
FIG. 12 A diagram showing an optical micrograph of the molded product of Comparative Example 1.
Figure 13:
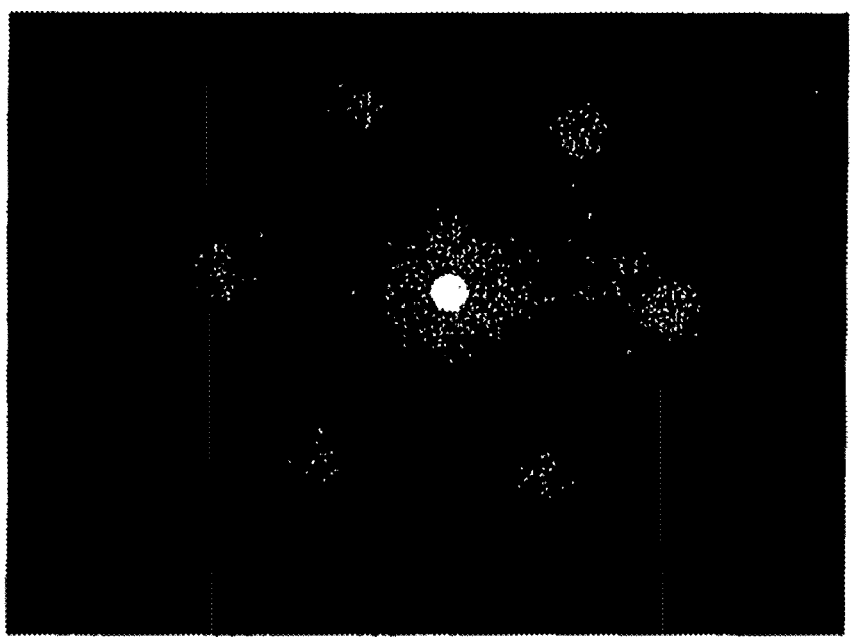
FIG. 13 A diagram showing a laser diffraction image using the molded product of Comparative Example 1.

1 Molded product
2 Matrix
3 Columnar structure
10 Mold
11 Main unit
12 Cover piece
20 Photopolymerizable composition
30 Irradiation light source
40 Photomask

The invention claimed is:

1. A method for manufacturing a molded product having a phase structure, comprising a matrix formed of a photopolymerizable composition, and multiple columnar structures disposed within said matrix and having an index of refraction different from said matrix, comprising:
   a step for injecting the photopolymerizable composition containing a photopolymerizable monomer or oligomer and a photoinitiator into a mold;
   a step for disposing a photomask having light-transmissive regions and a light non-transmissive region between the mold and a light source;
   a first light irradiation step for irradiating parallel light from the light source with a wavelength full width at half maximum of 100 nm or less and an essentially uniform light intensity distribution through the photomask toward the photopolymerizable composition within the mold to polymerize those sites within the photopolymerizable composition which are irradiated with parallel light into an incompletely polymerized state; and
   a second light irradiation step for irradiating parallel light with a wavelength full width at half maximum of 100 nm or less and an essentially uniform light intensity distribution toward the photopolymerizable composition within the mold after removing the photomask to complete the polymerization of the photopolymerizable composition,
   wherein in the photomask, many of the light-transmissive regions are disposed in a regular lattice in the light non-transmissive region.

2. A method for manufacturing the molded product in claim 1, whereby in the first light irradiation step, the photopolymerizable composition is polymerized to a polymerization degree of 10% or greater and 80% or less.

* * * * *